US012270513B2

(12) United States Patent
Handa

(10) Patent No.: US 12,270,513 B2
(45) Date of Patent: Apr. 8, 2025

(54) GAS FILLING METHOD

(71) Applicant: HONDA MOTOR CO., LTD., Tokyo (JP)

(72) Inventor: Kiyoshi Handa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 54 days.

(21) Appl. No.: 18/242,615

(22) Filed: Sep. 6, 2023

(65) Prior Publication Data

US 2024/0084971 A1 Mar. 14, 2024

(30) Foreign Application Priority Data

Sep. 8, 2022 (JP) ................................ 2022-142847

(51) Int. Cl.
*F17C 5/00* (2006.01)

(52) U.S. Cl.
CPC ...... *F17C 5/007* (2013.01); *F17C 2205/0335* (2013.01); *F17C 2205/0341* (2013.01); *F17C 2205/0352* (2013.01); *F17C 2221/012* (2013.01); *F17C 2227/0337* (2013.01); *F17C 2250/043* (2013.01); *F17C 2250/0636* (2013.01); *F17C 2250/0694* (2013.01); *F17C 2265/065* (2013.01); *F17C 2270/0168* (2013.01); *F17C 2270/0184* (2013.01)

(58) Field of Classification Search
CPC ................ F17C 5/007; F17C 2221/012; F17C 2227/0337
See application file for complete search history.

(56) References Cited

U.S. PATENT DOCUMENTS

| | | | | |
|---|---|---|---|---|
| 10,718,468 | B2 * | 7/2020 | Petit | F16K 15/023 |
| 11,326,740 | B2 * | 5/2022 | Yamaguchi | F17C 5/06 |
| 2017/0074456 | A1 | 3/2017 | Handa | |
| 2021/0262618 | A1 | 8/2021 | Handa | |

FOREIGN PATENT DOCUMENTS

| | | | |
|---|---|---|---|
| JP | 6514611 | B2 | 5/2019 |
| WO | 2019/235386 | A1 | 12/2019 |

OTHER PUBLICATIONS

Issuing Committee: Fuel Cell Standards Committee, "Fueling Protocols for Light Duty Gaseous Hydrogen Surface Vehicles" SAEJ2601 by SAE International in US, May 29, 2020.
(Draft) JPEC-S 0003 by Japan Petroleum Energy Center, "Technicla Standard for Filling Compressed Hydrogen", Feb. 17, 2016, with the English translation of the pertinent portion.

* cited by examiner

*Primary Examiner* — Timothy L Maust
(74) *Attorney, Agent, or Firm* — Carrier, Shende & Associates P.C.; Joseph P. Carrier; Fulchand P. Shende

(57) ABSTRACT

In a gas filling method for filling a tank with gas by supplying the gas from an accumulator to the tank through a flow rate adjusting valve and a pipe, a target pressure rise rate, which is a temporal change of a target tank pressure, is set when the tank is filled with the gas. During filling of the tank with the gas, the flow rate adjusting valve is adjusted so that a dispenser pressure, which is a gas pressure in the accumulator, becomes a pressure that is higher than the target tank pressure and enables the target pressure rise rate to be maintained.

4 Claims, 9 Drawing Sheets

GAS FILLING METHOD

CROSS-REFERENCE TO RELATED APPLICATIONS

This application is based upon and claims the benefit of priority from Japanese Patent Application No. 2022-142847 filed on Sep. 8, 2022, the contents of which are incorporated herein by reference.

BACKGROUND OF THE INVENTION

Field of the Invention

The present invention relates to a gas filling method for filling a tank with a fuel gas (gas) from a gas accumulator through a pipe.

Description of the Related Art

In recent years, research and development have been conducted on fuel cells (FC) that contribute to energy efficiency, in order to ensure that more people have access to affordable, reliable, sustainable and modern energy.

For example, a fuel cell vehicle is equipped with the fuel cell, a tank for storing the fuel gas, and a motor. The fuel cell generates electric power by an electrochemical reaction between the fuel gas supplied from the tank and an oxygen-containing gas (air). The fuel cell vehicle travels by driving the motor using the electric power generated by the fuel cell.

The tank mounted on the fuel cell vehicle is filled with a gas (fuel gas) through a pipe (including a hose) at a filling station (hydrogen station). The hydrogen station includes a high-pressure gas accumulator.

"Technical Standard for Filling Compressed Hydrogen" such as SAEJ2601 or JPEC-S 0003 (see "Target Pressure Rise Rate" in Appendix 1 of Technical Standard for Filling Compressed Hydrogen (Draft) JPEC-S 0003 (2016) by Japan Petroleum Energy Center) is applied to the control of filling of the fuel gas (compressed hydrogen) into the fuel cell vehicle or the like at the hydrogen station.

In the "Technical Standard for Filling Compressed Hydrogen", filling control is performed based on a detection value of a pressure sensor provided in the hydrogen station, in consideration of a fact that a pressure loss due to a pipe connecting the accumulator and the tank changes depending on a state such as temperature.

In the "Technical Standard for Filling Compressed Hydrogen", filling control is performed such that the temporal change (pressure rise rate) of the gas pressure in the hydrogen station detected by the pressure sensor is constant (see FIG. 2 on page 12 of "Target Pressure Rise Rate" in Appendix 1 of Technical Standard for Filling Compressed Hydrogen (Draft) JPEC-S 0003 (2016) by Japan Petroleum Energy Center).

SUMMARY OF THE INVENTION

Incidentally, when the pressure loss in the pipe connecting the gas accumulator and the tank is large, there is a problem in that the pressure in the tank does not rise easily, and it takes a long time until the tank becomes full.

An object of the present invention is to solve the above-described problem.

According to an aspect of the present invention, there is provided a gas filling method for filling a tank with gas from an accumulator of the gas in a gas filling system, the gas filling system including: the tank; the accumulator; and a pipe configured to connect the accumulator and the tank, and supply the gas from the accumulator to the tank, the gas filling method comprising: setting a target pressure rise rate which is a temporal change of a target tank pressure, when the tank is filled with the gas; and adjusting, during filling of the tank with the gas, a flow rate of the gas supplied from the accumulator to the tank in a manner so that a dispenser pressure, which is a gas pressure in the accumulator, becomes a pressure that is higher than the target tank pressure and allows the target pressure rise rate to be maintained.

According to the present invention, the tank can be accurately filled up to the fully-filled tank pressure in a short time. This in turn contributes to energy efficiency.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

[Configuration of Hydrogen Filling System]

Figure 1:
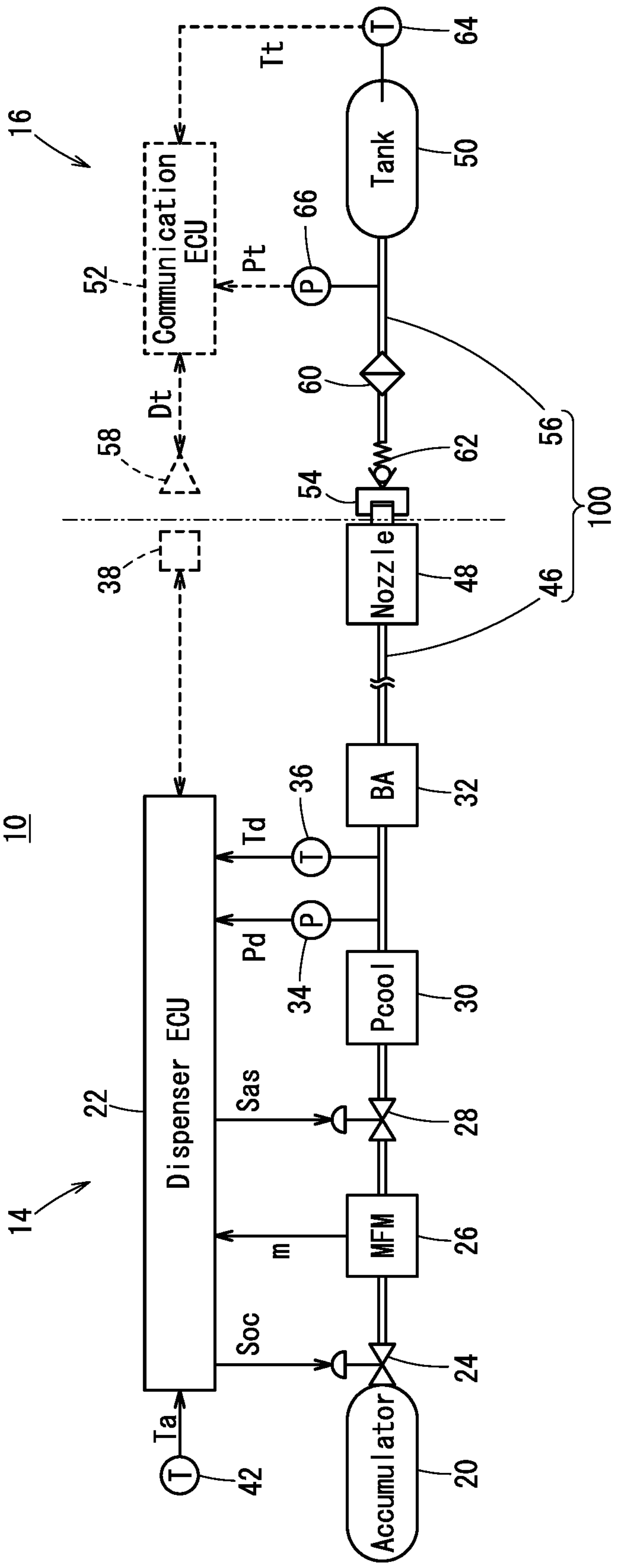
FIG. 1 is a configuration diagram of a hydrogen filling system according to an embodiment to which a gas filling method according to an embodiment is applied.

FIG. 1 shows a configuration of a hydrogen filling system (gas filling system) 10 according to an embodiment to which a gas filling method according to an embodiment is applied.

The hydrogen filling system 10 includes a hydrogen station 14 which is a filling station (filling stand) shown on the left side of the two dot chain line, and a fuel cell vehicle (vehicle) 16 shown on the right side of the two dot chain line.

The hydrogen station 14 includes an accumulator 20 serving as a supply source of hydrogen gas (gas) which is a fuel gas.

The vehicle 16 is equipped with a hydrogen tank (tank) 50 filled with the gas supplied from the accumulator 20.

The vehicle 16 includes a fuel cell (not shown) and a travel motor (not shown), in addition to the tank 50 that stores the filled gas.

The fuel cell generates electric power by an electrochemical reaction between the fuel gas supplied from the tank 50 and an oxygen-containing gas (air) supplied from a compressor (not shown).

The vehicle 16 is a fuel cell vehicle that travels by driving the motor using electric power generated by the fuel cell.

Examples of the fuel cell vehicle include a relatively small passenger car and a large vehicle such as a bus or truck.

The fuel cell vehicle is a moving body which includes the tank 50 for storing gas and the fuel cell, and travels on the ground.

The moving body to which the present invention is applied is not limited to a moving body traveling on the ground, but includes an airplane, a ship, a submarine, and the like.

As shown in FIG. 1, the hydrogen station 14 includes a dispenser electronic control unit (ECU) 22, and the vehicle 16 includes a communication ECU 52.

In FIG. 1, the communication ECU 52 drawn by the broken line and the components related to the communication ECU 52 are not necessary for implementing (using) the gas filling method according to the embodiment.

Each of the dispenser ECU 22 and the communication ECU 52 is a control device, and is constituted by a computer including one or more processors (CPUs), a memory (storage device), a timer (time measurement device), a counter (counting device), an input/output interface, and an electronic circuit.

The one or more processors (CPUs) execute a program stored in the memory. In addition to the program, data such as acquired physical quantities and various control maps referred to by the data are recorded in the memory.

The processors (CPUs) execute calculations (various functions) by referring to the control map as necessary in accordance with the program based on the acquired physical quantities or the like.

In FIG. 1, the vehicle 16 includes a vehicle pipe (pipe) 56 extending from the tank 50 to a receptacle 54, and a communication device 58 using infrared rays or the like to transmit and receive data signals Dt to and from the hydrogen station 14.

The vehicle pipe 56 connecting the tank 50 and the receptacle 54 is provided with a dust filter 60, and a check valve 62 that is provided near the receptacle 54 and prevents the gas from flowing back from the tank 50 toward the receptacle 54.

An in-tank temperature sensor 64 is provided inside the tank 50, and a pressure sensor 66 is provided in the vehicle pipe 56 near the tank 50.

The communication ECU 52 acquires a tank temperature Tt detected by the in-tank temperature sensor 64 and an in-tank pressure (tank pressure) Pt detected by the pressure sensor 66, and generates the data signal Dt.

The generated data signal Dt is transmitted via the communication device 58 to the dispenser ECU 22 through a communication device 38 provided in the hydrogen station 14.

The communication device 38 provided in the hydrogen station 14 is integrally attached to a nozzle 48.

When the nozzle 48 of the hydrogen station 14 is connected to the receptacle 54 of the vehicle 16, the communication device 38 faces the communication device 58 provided in the vehicle 16. As a result, the data signal Dt or the like can be transmitted and received between the communication devices 38 and 58 via radio waves such as infrared rays.

The accumulator 20 of the hydrogen station 14 stores high-pressure hydrogen gas to be supplied to the tank 50 of the vehicle 16.

The accumulator 20 is provided with a shut-off valve 24. A station pipe 46 extending from the shut-off valve 24 to the nozzle 48 is connected between the shut-off valve 24 and the nozzle 48.

The accumulator 20 and the tank 50 are connected to each other (communicate with each other) by a pipe 100 formed of the station pipe 46 and the vehicle pipe 56.

The station pipe (pipe) 46 is provided with a mass flow meter (MFM) (or a flow rate sensor) 26, a flow rate adjusting valve 28, a precooler (Pcool) 30, and a breakaway (BA) 32 in this order from the shut-off valve 24 toward the nozzle 48. A portion of the pipe 46 between the breakaway 32 and the nozzle 48 is formed as a flexible hose.

A pressure sensor 34 and a temperature sensor 36 are provided in the pipe 46 between the precooler 30 and the breakaway 32.

The pressure sensor 34 detects the gas pressure in the accumulator 20 (the hydrogen station 14) obtained when the shut-off valve 24 is open, as a dispenser pressure (gas pressure) Pd. The temperature sensor 36 detects the temperature of the gas supplied from the accumulator 20, as a dispenser temperature (dispenser gas temperature) Td.

The flow rate sensor 26 detects a mass flow rate (flow rate) m [kg/s] of the gas flowing through the pipe 100.

The dispenser pressure Pd, the dispenser gas temperature Td, and the flow rate m detected by the pressure sensor 34, the temperature sensor 36, and the flow rate sensor 26, respectively, are acquired as physical quantities by the dispenser ECU 22.

The shut-off valve 24 is opened and closed by an opening/closing signal Soc output from the dispenser ECU 22. The shut-off valve 24 transitions from an open state to a closed state in response to the opening/closing signal Soc serving as a closing signal, and maintains the closed state. The shut-off valve 24 transitions from the closed state to the open state in response to the opening/closing signal Soc serving as an opening signal, and maintains the open state.

The opening degree of the flow rate adjusting valve 28 can be continuously adjusted by a flow rate adjusting signal Sas output from the dispenser ECU 22. In other words, the gas flow rate in the pipe 100 can be continuously adjusted by the flow rate adjusting valve 28 whose opening degree is adjusted by the flow rate adjusting signal Sas. The dispenser pressure Pd is controlled (adjusted) by adjusting the gas flow rate in the pipe 100.

The precooler 30 cools the gas supplied from the accumulator 20 to the vehicle pipe 56 at a position before the gas is filled into the tank 50 to suppress a temperature rise of the gas in the tank 50, thereby enabling rapid filling.

The breakaway 32 is a safety device connected between the accumulator 20 and the nozzle 48. When the nozzle 48 is pulled by a strong external force, the breakaway 32 automatically closes its valve to block the flow path and cut off the gas flow.

The hydrogen station 14 is provided with an ambient temperature sensor (temperature sensor) 42 that detects an ambient temperature Ta. The ambient temperature Ta detected by the temperature sensor 42 is acquired by the dispenser ECU 22.

[Outline of Gas Filling Method According to Embodiment]

The hydrogen filling system 10 to which the gas filling method according to the embodiment is applied is basically configured as described above. Here, an outline of the gas filling method according to the embodiment will be described.

(i) The dispenser ECU 22 sets a target pressure rise rate Rptar which is a temporal change amount of the tank pressure Pt. The target pressure rise rate Rptar can be set to a constant (linear) pressure rise rate or a nonlinear pressure rise rate.

As will be described later with reference to FIG. 3, the target pressure rise rate Rptar is expressed using a target pressure rise amount ΔPt_next as a target rise amount of the tank pressure Pt during a time step Δt [sec] which is a predetermined minute time {Rptar=(ΔPt_next)/Δt}.

(ii) The dispenser ECU 22 adjusts the flow rate of the gas so that the tank pressure Pt rises at the target pressure rise rate Rptar. That is, the dispenser ECU 22 fills the tank 50 with the gas so that the tank pressure Pt rises at the target pressure rise rate Rptar.

(iii) Incidentally, the dispenser ECU 22 detects the dispenser pressure Pd but does not detect the tank pressure Pt. The actual tank pressure Pt is lower than the dispenser pressure Pd due to a pressure loss dPloss in the pipe 100. For this reason, the dispenser ECU 22 estimates the pressure loss dPloss in the pipe 100 that changes depending on the state of the gas during filling of the gas.

(iv) The dispenser ECU 22 adjusts the opening degree of the flow rate adjusting valve 28 so that the dispenser pressure Pd (target pressure) detected by the pressure sensor 34 satisfies the following Formula (1).

$$Pd = dPloss + Pt \quad (1)$$

where Pd: dispenser pressure (target pressure); dPloss: pressure loss (estimated value); Pt: tank pressure (estimated value of the tank pressure that rises at the target pressure rise rate Rptar) (that changes with time in the positive direction))

Figure 4:
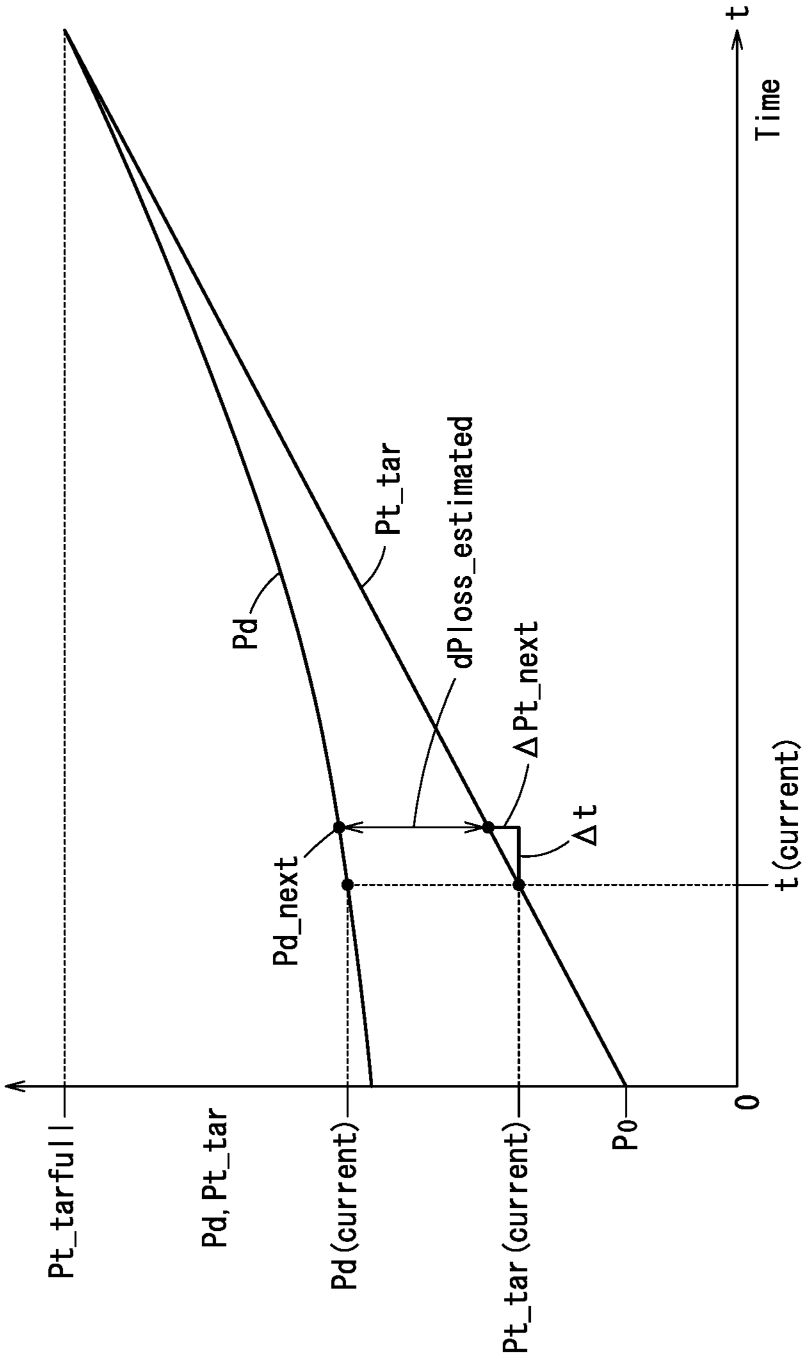
FIG. 4 is a timing chart showing temporal changes of a tank pressure and a dispenser pressure.

That is, the dispenser ECU 22 adjusts the opening degree of the flow rate adjusting valve 28 so that the dispenser pressure Pd becomes a value obtained by adding the pressure loss dPloss (which is an estimated value and indicated by dPloss_estimated in FIG. 4) to the tank pressure Pt (non-detected) calculated every time step Δt.

[Configuration and Operation of Flow Rate Adjusting Signal Generator]

In order to execute the gas filling method according to the embodiment, it is necessary to calculate a dispenser target pressure Pd_next which is the dispenser pressure Pd increased after each time step Δt [sec] which is a predetermined minute time.

Figure 2:
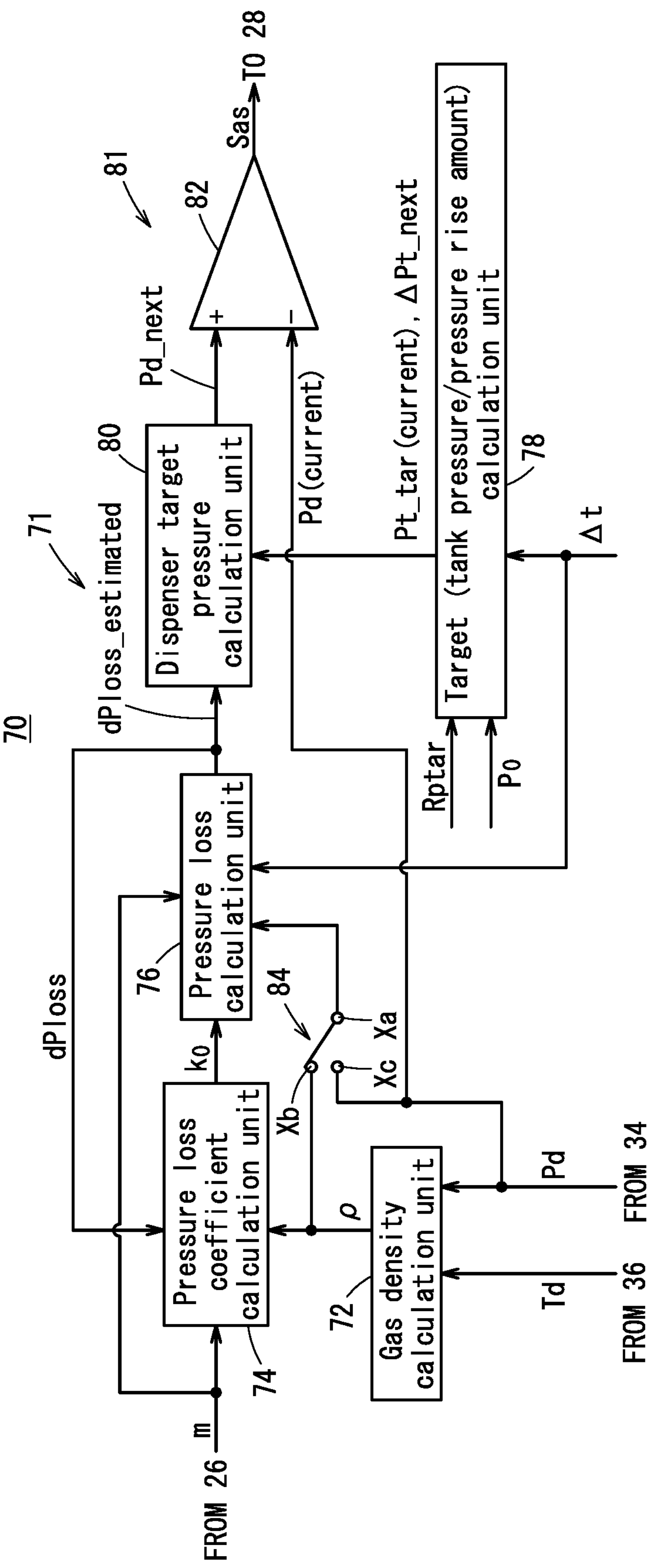
FIG. 2 is a block diagram showing a configuration of a flow rate adjusting signal generator achieved by a calculation function or the like of a dispenser ECU.

FIG. 2 is a block diagram showing a configuration of a flow rate adjusting signal generator 70 achieved by a calculation function or the like of the dispenser ECU 22.

The flow rate adjusting signal generator 70 includes a dispenser target pressure calculation section 71, and a target pressure feedback control section 81.

As shown in FIG. 2, the dispenser target pressure calculation section 71 includes a gas density calculation unit 72, a pressure loss coefficient calculation unit 74, a pressure loss calculation unit 76, a target (tank pressure/pressure rise amount) calculation unit 78, a dispenser target pressure calculation unit 80, and a leak check switch 84.

The target pressure feedback control section 81 includes a differential amplifier (output amplifier) 82 that functions as a comparison amplifier. The output amplifier 82 generates the flow rate adjusting signal Sas by amplifying the difference (Pd_next−Pd (current)) so that a current dispenser pressure Pd (current) matches the dispenser target pressure Pd_next.

The gas density calculation unit 72 included in the dispenser target pressure calculation section 71 calculates a gas density ρ [kg/m 3] of the gas flowing through the pipe 100.

The gas density ρ is calculated based on a gas state equation with reference to the current dispenser pressure Pd (current) detected by the pressure sensor 34 and a current dispenser gas temperature Td (current) detected by the temperature sensor 36 (see Formula (2)).

$$\rho = \rho(Pd(\text{current}), Td(\text{current})) \quad (2)$$

The gas density ρ calculated by the gas density calculation unit 72 is output from the gas density calculation unit 72 to the pressure loss coefficient calculation unit 74, and is output to the pressure loss calculation unit 76 through a fixed contact Xb and a common contact (moving contact) Xa of the leak check switch 84.

The pressure loss coefficient calculation unit 74 calculates a pressure loss coefficient k0 according to Formula (3) using the gas density p, the current mass flow rate m [kg/s] detected by the flow rate sensor 26, and the pressure loss dPloss [MPa] due to the pipe 100 calculated by the pressure loss calculation unit 76.

$$k0 = dPloss \times \rho / (m(\text{current})^2) \quad (3)$$

As the pressure loss coefficient k0, a typical value or a provisional value such as a past mean value is used before the pressure loss dPloss is calculated for the first time, in other words, at the start of filling.

The pressure loss coefficient calculation unit 74 outputs the calculated pressure loss coefficient k0 to the pressure loss calculation unit 76.

[Calculation of Pressure Loss dPloss]

The pressure loss calculation unit 76 calculates the pressure loss dPloss at the time of leak check, and outputs the pressure loss dPloss to the pressure loss coefficient calculation unit 74.

The pressure loss dPloss based on the amount of change in the dispenser pressure Pd at the time of the leak check performed while the tank 50 is being filled with the gas is calculated by, for example, the following Formula (4).

$$dPloss = Pd(i) - Pd(i+tc) \quad (4)$$

Here, Pd (i) is the dispenser pressure Pd obtained immediately before the leak check, and Pd (i+tc) is the dispenser pressure Pd obtained when a leak check time tc has elapsed. The leak check time tc is about several seconds, and is set to 3 seconds, for example, in this embodiment.

The leak check is performed at an appropriate time to detect a gas leak in the pipe 100. At the time of leak check, the fixed contact to which the moving contact Xa of the leak check switch 84 is connected is switched from the normally closed fixed contact Xb to a fixed contact (momentary contact) Xc for, for example, about several seconds. During the leak check time (time) tc of about several seconds, the moving contact Xa is connected to the fixed contact Xc.

In synchronization with this connection (switching of the contacts), the shut-off valve 24 is closed during the time tc in response to the opening/closing signal Soc serving as the closing signal that is supplied from the dispenser ECU 22. During the shut-off period of gas supply, during which the shut-off valve 24 is closed, the dispenser ECU 22 monitors whether or not the dispenser pressure Pd changes, for the purpose of checking gas leak. The dispenser ECU 22 determines that there is a gas leak when the dispenser pressure Pd changes during the shut-off period, and determines that there is no gas leak when the dispenser pressure Pd does not change during the shut-off period. When it is determined that there is a gas leak, the dispenser ECU 22 generates an abort signal and stops the gas filling process.

[Calculation of Estimated Pressure Loss dPloss_Estimated]

During the supply of the gas from the accumulator 20 to the tank 50 and when the leak check is not performed, the pressure loss calculation unit 76 calculates an estimated pressure loss dPloss_estimated, which is an estimated value of the pressure loss dPloss, for each time step Δt which is a minute time, and outputs the estimated pressure loss dPloss_estimated to the dispenser target pressure calculation unit 80.

The pressure loss calculation unit 76 calculates the estimated pressure loss dPloss_estimated according to the following Formula (5) based on the pressure loss coefficient k0, the current gas density ρ, and the current flow rate m (current).

$$dPloss\_estimated = k0(m(\text{current})^2/\rho(Pd(\text{current}), Td(\text{current}))) \quad (5)$$

[Calculation of Target Tank Pressure Pt_tar and Target Pressure Rise Amount ΔPt_next]

The target (tank pressure/pressure rise amount) calculation unit 78 calculates (estimates) a target tank pressure Pt_tar and the target pressure rise amount ΔPt_next for each time step Δt.

Figure 3:
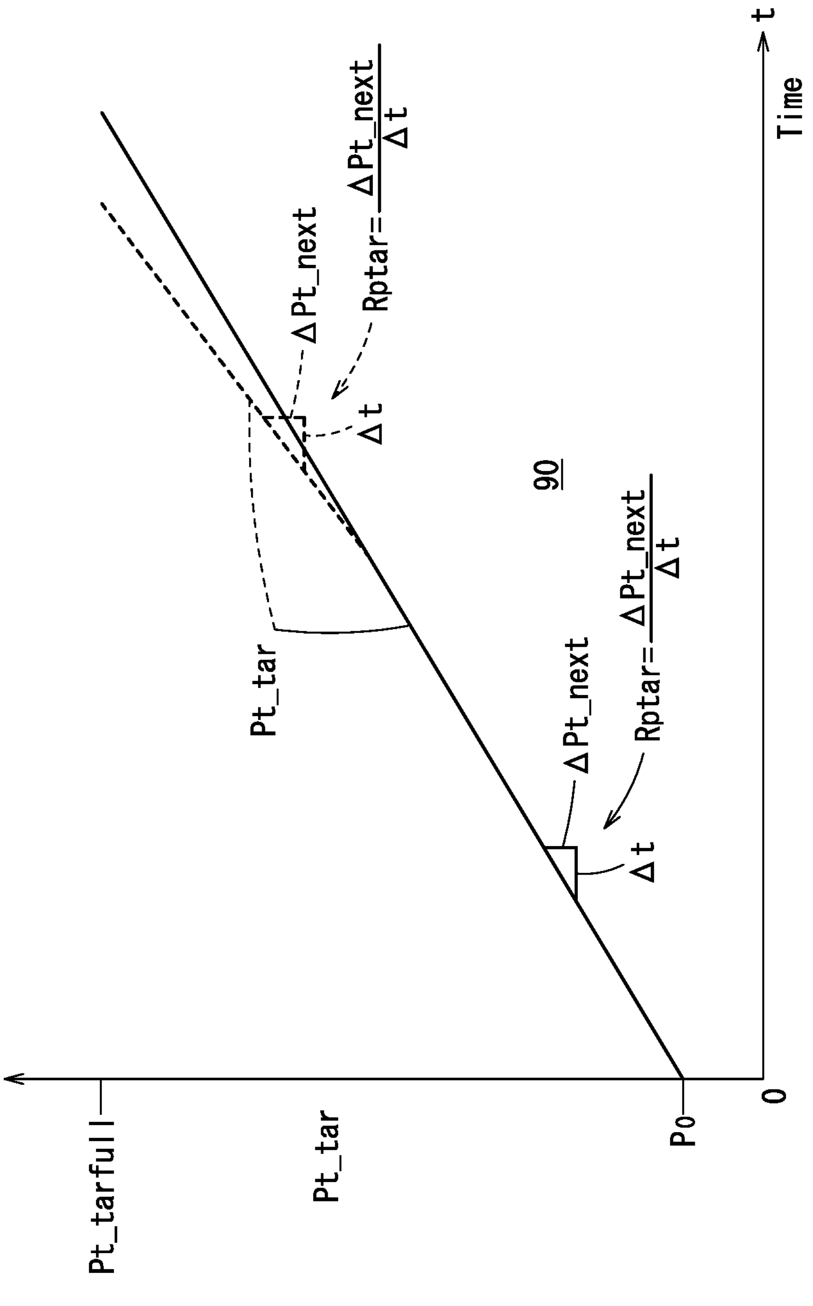
FIG. 3 is a target pressure rise rate map.

FIG. 3 shows a target pressure rise rate map 90 as an example recorded in advance in the memory of the dispenser ECU 22, and a temporal change of the target tank pressure Pt_tar that rises along the target pressure rise rate map 90.

The target pressure rise rate Rptar for each time step Δt along the time axis, which is the horizontal axis, is recorded in the target pressure rise rate map 90.

When the target pressure rise rate map 90 in which the target pressure rise rate Rptar=(ΔPt_next/Δt) indicated by the solid straight line is constant is set, the filling control is simplified, and the continuity of the filling control can be easily maintained even when the filling control is temporarily stopped in the middle and is restarted.

As indicated by the broken line in FIG. 3, for example, the target pressure rise rate Rptar may be a nonlinear pressure rise rate as a whole such that the target pressure rise rate Rptar increases in the latter half period. It should be noted that pressure rise rate may not only linearly increase as a linear function but also gradually increase along a curve.

However, the target pressure rise rate map 90 is set by limiting the upper limit value of the target tank pressure Pt_tar so that the value of the target tank pressure Pt_tar does not exceed the supply pressure allowable range upper limit value (linearly increasing) of the dispenser target pressure Pd_next.

An initial tank pressure $P_0$ and a target tank pressure (fully-filled tank pressure) Pt_tarfull are graduated on the vertical axis in FIG. 3, which indicates the target tank pressure Pt_tar.

The target pressure rise amount ΔPt_next is calculated for each time step Δt by the target (tank pressure/pressure rise amount) calculation unit 78 using Formula (6).

$$\Delta Pt\_next = Rptar \times \Delta t \quad (6)$$

A current target tank pressure Pt_tar (current) calculated (estimated) by the target (tank pressure/pressure rise amount) calculation unit 78 increases with time in accordance with Formula (7).

$$Pt\_tar(\text{current}) = Rptar \times t(\text{current}) + P_0 \quad (7)$$

where t (current) is the integrated value of the time step Δt from time 0.

The target pressure rise amount ΔPt_next and the current target tank pressure Pt_tar (current) that are calculated by the target (tank pressure/pressure rise amount) calculation unit 78 are output from the target (tank pressure/pressure rise amount) calculation unit 78 to the dispenser target pressure calculation unit 80.

[Calculation of Dispenser Target Pressure Pd_next]

Based on the current target tank pressure Pt_tar (current), the target pressure rise amount ΔPt_next, and the estimated pressure loss dPloss_estimated that have been estimated (calculated), the dispenser target pressure calculation unit 80 calculates the dispenser target pressure Pd_next represented by Formula (8) (see FIG. 4).

$$Pd\_next = Pt\_tar(\text{current}) + \Delta Pt\_next + dPloss\_estimated \quad (8)$$

According to Formula (8), the dispenser target pressure Pd_next is calculated as the sum of the current target tank pressure Pt_tar (current), the target pressure rise amount ΔPt_next, and the estimated pressure loss dPloss_estimated.

Formula (9) indicates the dispenser target pressure Pd_next obtained by substituting Formula (6) for ΔPt_next in Formula (8) and Formula (5) for dPloss_estimated in Formula (8).

$$Pd\_next = (Pt\_tar(\text{current}) + Rptar \times \Delta t) + k0(m(\text{current})^2/\rho(Pd(\text{current}), Td(\text{current}))) \quad (9)$$

[Flow Rate Control by Flow Rate Adjusting Signal Generator 70 of Dispenser ECU 22]

The dispenser target pressure calculation section 71 outputs the dispenser target pressure Pd_next calculated according to Formula (9) to the non-inverting input terminal of the output amplifier 82.

The current dispenser pressure Pd (current) detected by the pressure sensor 34 is input to the inverting input terminal of the output amplifier 82.

The dispenser ECU 22 adjusts the opening degree of the flow rate adjusting valve 28 by changing the flow rate adjusting signal Sas of the output amplifier 82 so that the current dispenser pressure Pd (current) input to the inverting input terminal of the output amplifier 82 becomes the dispenser target pressure Pd_next input to the non-inverting input terminal of the output amplifier 82 for each time step Δt (see FIG. 4).

The adjustment of the gas flow rate by the flow rate adjusting valve 28 is continuously performed until the dispenser target pressure Pd_next reaches the fully-filled tank pressure Pt_tarfull (see FIG. 4).

As can be seen from Formula (8) or (9), it is not necessary to detect the tank pressure Pt and the tank temperature Tt in order to calculate the dispenser target pressure Pd_next. In other words, the data signal Dt is not necessary to calculate the dispenser target pressure Pd_next.

FIG. 4 shows an example of a temporal change of the dispenser pressure Pd to be controlled when the tank pressure Pt is increased at the linear target pressure rise rate Rptar.

At a current time t (current), the dispenser ECU 22 calculates the dispenser target pressure Pd_next after the time step Δt has elapsed, and sets the dispenser target pressure Pd_next in the output amplifier 82. The output amplifier 82 generates the flow rate adjusting signal Sas for adjusting the opening degree of the flow rate adjusting valve 28 (for adjusting the gas flow rate) so that the current dispenser pressure Pd (current) detected by the pressure sensor 34 becomes the dispenser target pressure Pd_next that has been set.

By controlling the flow rate adjusting valve 28 in accordance with the flow rate adjusting signal Sas, the tank pressure Pt can be linearly increased from the initial tank pressure $P_0$ to the fully-filled tank pressure Pt_tarfull along the target tank pressure Pt_tar.

In this case, in the gas filling method according to the embodiment, since the pressure difference between the dispenser pressure Pd and the tank pressure Pt is large at the beginning of filling (the first half of filling), gas can be filled at a large volume flow rate. Therefore, it is possible to shorten the filling time until the fully-filled tank pressure Pt_tarfull is reached. In addition, the filling time does not vary. In other words, the tank can be accurately filled up to the fully-filled tank pressure Pt_tarfull in a short time.

Even if filling is interrupted and then restarted, the dispenser ECU 22 can easily maintain the continuity of the target tank pressure Pt_tar to continue filling.

[Description Using Flowchart of Gas Filling Method According to Embodiment]

Figure 5:
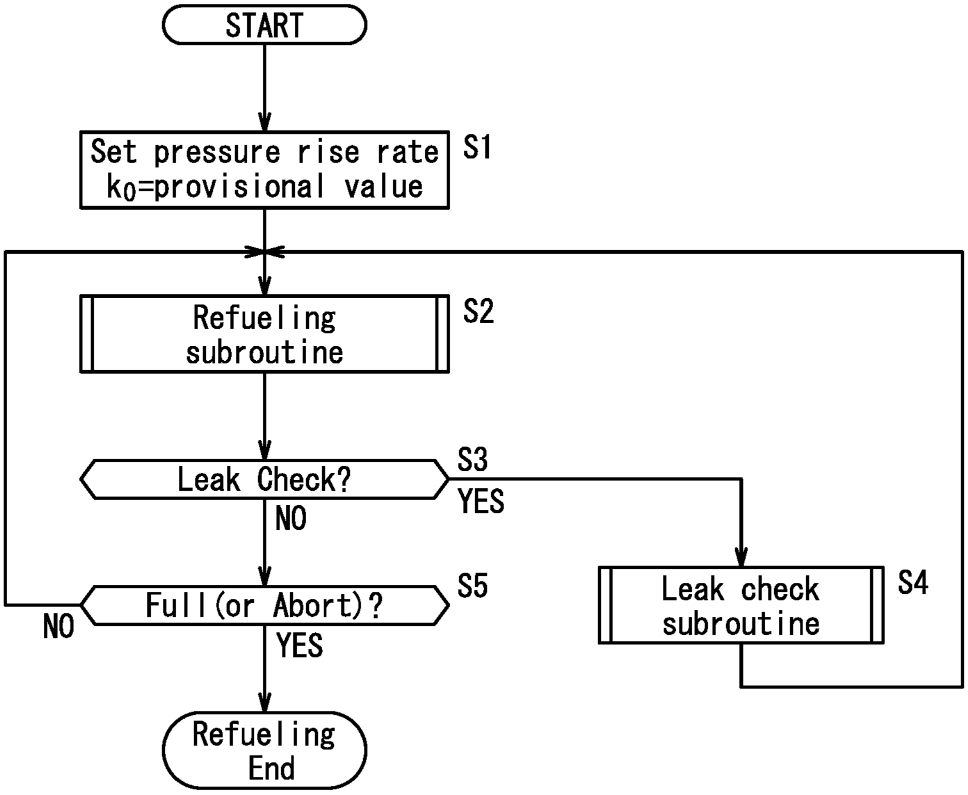
FIG. 5 is a flowchart for explaining the operation of the hydrogen filling system according to the embodiment to which the gas filling method according to the embodiment is applied.

Next, the operation of the hydrogen filling system 10 according to an embodiment to which the gas filling method according to the embodiment is applied will be described in detail based on the flowchart shown in FIG. 5. It should be noted that, unless otherwise specified, the CPU of the dispenser ECU 22 executes the program according to the flowchart, and the CPU of the dispenser ECU 22 will also be simply referred to as a CPU.

Prior to starting the filling of the tank 50 of the vehicle 16 with gas, the nozzle 48 of the hydrogen station 14 is fitted into the receptacle 54 of the vehicle 16 by an operator or the like, in a state where the shut-off valve 24 of the accumulator 20 of the hydrogen station 14 is closed.

When a filling start button (not shown) of the hydrogen station 14 is operated by the operator or the like, the CPU obtains the dispenser pressure Pd using the pressure sensor 34 indicating (detecting) the tank pressure Pt, and sets the dispenser pressure Pd as the initial tank pressure $P_0$ ($Pd=Pt=P_0$).

In step S1, referring to the target pressure rise rate map 90 shown in FIG. 3, the CPU sets the target pressure rise rate Rptar in the target (tank pressure/pressure rise amount) calculation unit 78, and sets the provisional pressure loss coefficient k0 in the pressure loss coefficient calculation unit 74, and the process proceeds to a gas refueling subroutine of step S2.

Figure 6:
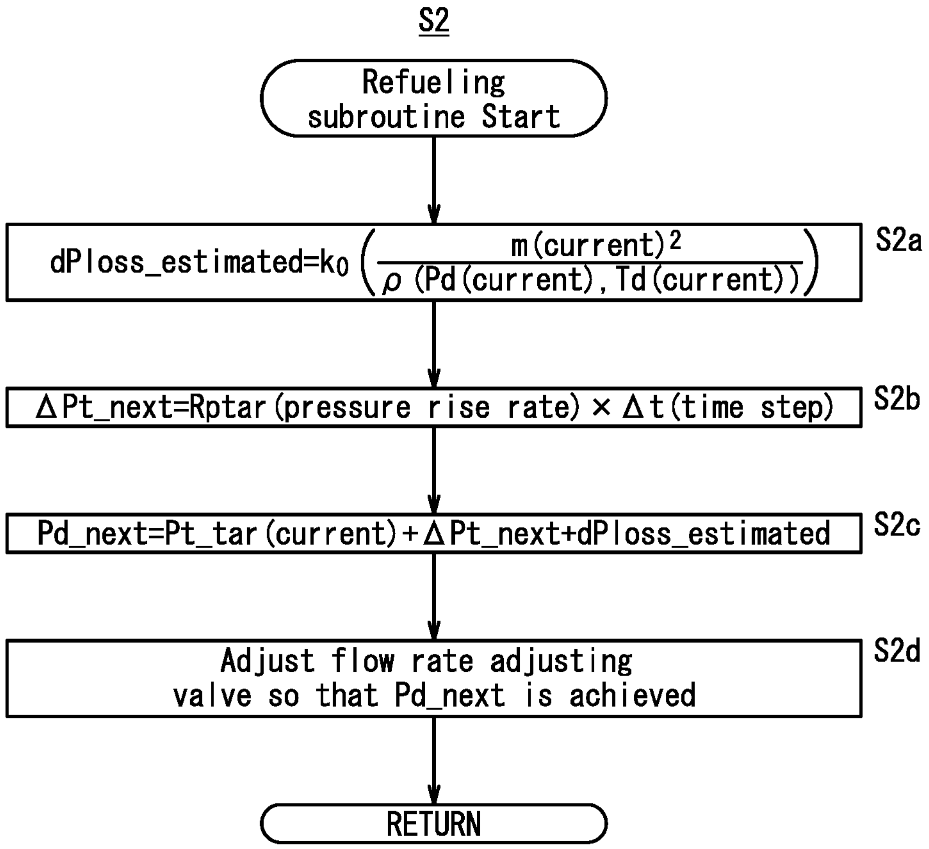
FIG. 6 is a flow chart of a gas refueling subroutine.

FIG. 6 shows a flow chart of the gas refueling subroutine of step S2.

In step S2*a*, the CPU opens the shut-off valve 24 (if opened, it is left open), and causes the pressure loss calculation unit 76 to calculate the estimated pressure loss dPloss_ estimated represented by Formula (5), and the process proceeds to step S2*b*.

In step S2*b*, the CPU causes the target (tank pressure/pressure rise amount) calculation unit 78 to calculate (estimate) the target pressure rise amount ΔPt_next of the tank 50 in the next time step Δt in accordance with Formula (6), and the process proceeds to step S2*c*.

In step S2*c*, the CPU causes the dispenser target pressure calculation unit 80 to calculate the dispenser target pressure Pd_next represented by Formula (8), and the process proceeds to step S2*d*.

In step S2*d*, the CPU causes the output amplifier 82 to adjust the opening degree of the flow rate adjusting valve 28 so that the current dispenser pressure Pd (current) becomes the dispenser target pressure Pd_next after the time step Δt has elapsed, and the process exits the subroutine of step S2 and proceeds to step S3.

In step S3, the CPU determines whether or not the timing for performing a leak check (gas leak check) process has come. If the determination is affirmative (step S3: YES), the process proceeds to a leak check subroutine of step S4.

Figure 7:
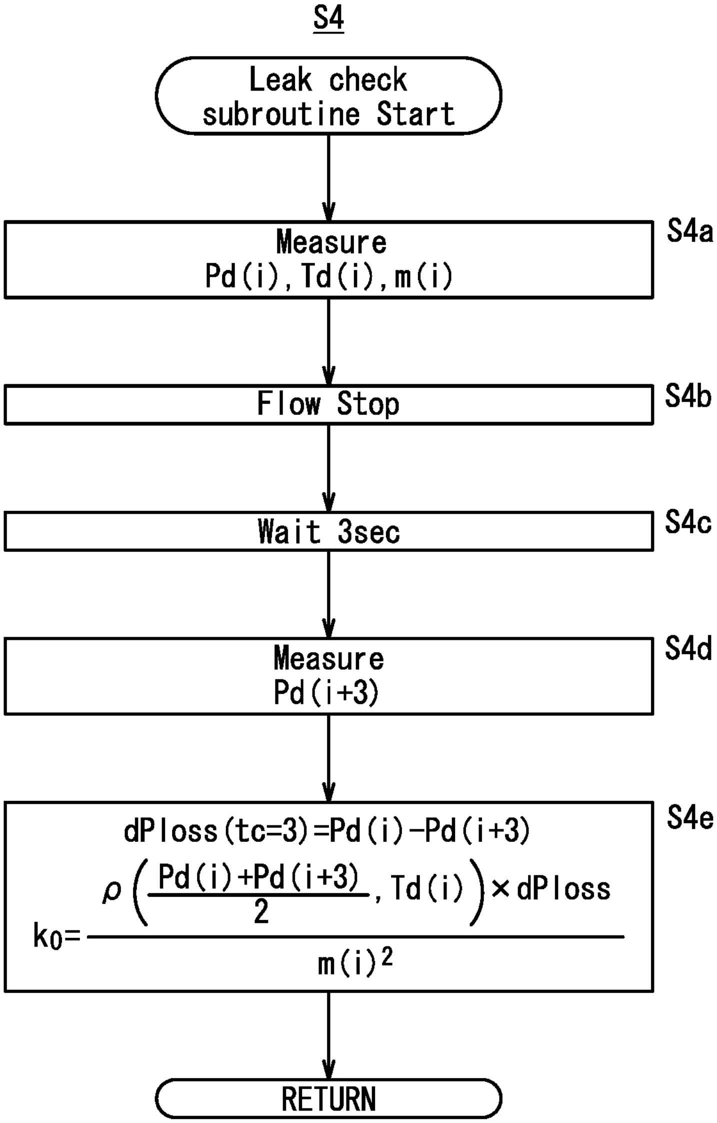
FIG. 7 is a flowchart of a leak check subroutine.

FIG. 7 shows a flowchart of the leak check subroutine of step S4.

Figure 8:
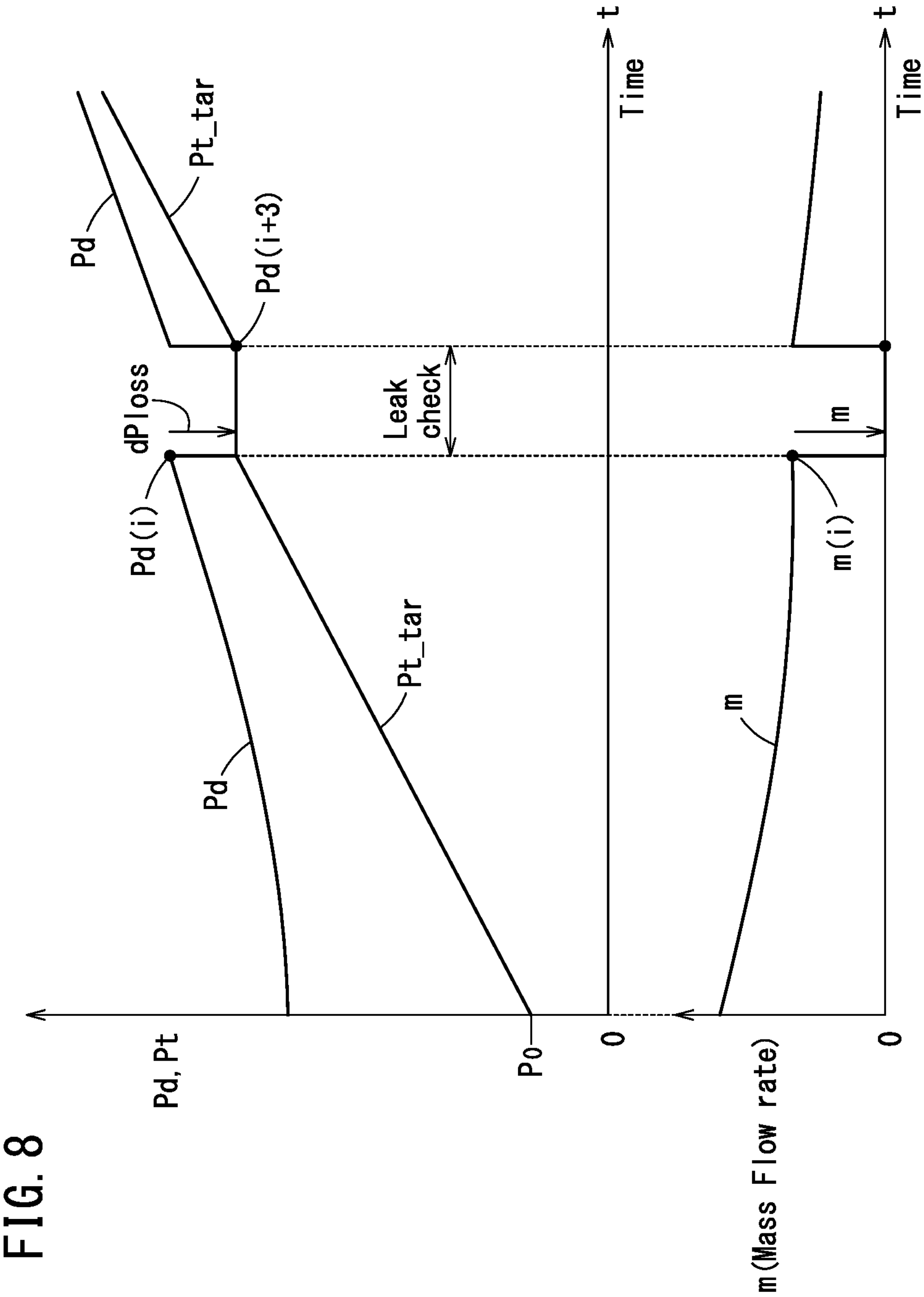
FIG. 8 is a timing chart showing temporal changes of a dispenser pressure and a flow rate detected during the leak check.

FIG. 8 shows temporal changes of the dispenser pressure Pd and the flow rate m detected during the leak check. The tank pressure Pt is the target tank pressure Pt_tar (estimated value) that is based on Formula (7).

In step S4*a*, the CPU detects a dispenser pressure Pd (i) immediately before the leak check, namely, immediately before the opened shut-off valve 24 is closed, a dispenser gas temperature Td (i) immediately before the leak check, and a flow rate m (i) immediately before the leak check by using the pressure sensor 34, the temperature sensor 36, and the flow rate sensor 26, respectively, and the process proceeds to step S4*b*.

In step S4*b*, the CPU closes the shut-off valve 24 to interrupt the supply of the gas from the accumulator 20 to the tank 50. At this time, the flow rate m of the gas detected by the flow rate sensor 26 becomes 0 (m=0).

In step S4*c*, the CPU performs the leak check for a leak check time tc of several seconds, for example, three seconds, using preset down counting by a timer counter (not shown).

When the detection value of the dispenser pressure Pd detected by the pressure sensor 34 changes during the leak check in which the shut-off valve 24 is closed, the CPU estimates that a gas leak occurs in the hydrogen filling system 10, and urgently stops the gas filling process.

In step S4*c*, when the timer counter (not shown) finishes counting the leak check time tc in a state where no gas leak is detected, the process proceeds to step S4*d*.

In step S4*d*, the CPU detects (measures) a dispenser pressure Pd (i+3) using the pressure sensor 34 after the leak check time tc has elapsed, namely, immediately before the shut-off valve 24 is opened next, and the process proceeds to step S4*e*.

In step S4*e*, as described with reference to FIG. 8, the CPU causes the pressure loss calculation unit 76 to calculate a pressure loss dPloss (tc=3) according to Formula (4), and causes the pressure loss coefficient calculation unit 74 to calculate the pressure loss coefficient k0 according to Formulae (2) and (3). For specific examples of the pressure loss dPloss (tc=3) and the pressure loss coefficient k0, refer to the description in the box of step S4*e* in FIG. 7.

At this time, the process exits the subroutine of step S4 and returns to the gas refueling subroutine of step S2.

In step S3 described above, when the timing for performing the leak check process has not come (step S3: NO), the process proceeds to step S5.

In step S5, the CPU checks whether the dispenser pressure Pd has reached the fully-filled tank pressure Pt_tarfull of the tank 50 or whether the abort signal has been generated. When the dispenser pressure Pd has not reached the fully-filled tank pressure Pt_tarfull and the abort signal has not been generated (step S5: NO), the process proceeds to the gas refueling subroutine of step S2.

In step S2, the CPU continues the gas filling process, and causes the output amplifier 82 to adjust the opening degree of the flow rate adjusting valve 28 so that the current dispenser pressure Pd becomes the dispenser target pressure Pd_next after the time step Δt has elapsed, and the process exits the subroutine of step S2 and proceeds to step S3.

In step S3, when the timing for performing the leak check process has not come (step S3: NO), the process proceeds to step S5.

In step S5, when the dispenser pressure Pd reaches the fully-filled tank pressure Pt_tarfull of the tank 50, the CPU ends the current filling process. Alternatively, when the CPU confirms that the abort signal has been generated in step S5, the CPU immediately stops the current refueling process even if the fully-filled tank pressure Pt_tarfull is not reached.

In this manner, in the above-described gas filling method, when the gas is supplied from the accumulator 20 to the tank 50 through the flow rate adjusting valve 28 and the pipe 100 to fill the tank 50 with the gas, the target pressure rise rate Rptar, which is the temporal change of the target tank pressure Pt_tar, is set (step S1), and during filling of the tank 50 with the gas, the flow rate adjusting valve 28 is adjusted so that the dispenser pressure Pd, which is the gas pressure in the accumulator 20, becomes the dispenser target pressure Pd_next which is higher than the target tank pressure Pt_tar and enables the target pressure rise rate Rptar to be maintained (step S2*d*).

[Comparative Explanation of Comparative Example and Embodiment]

Figure 9:
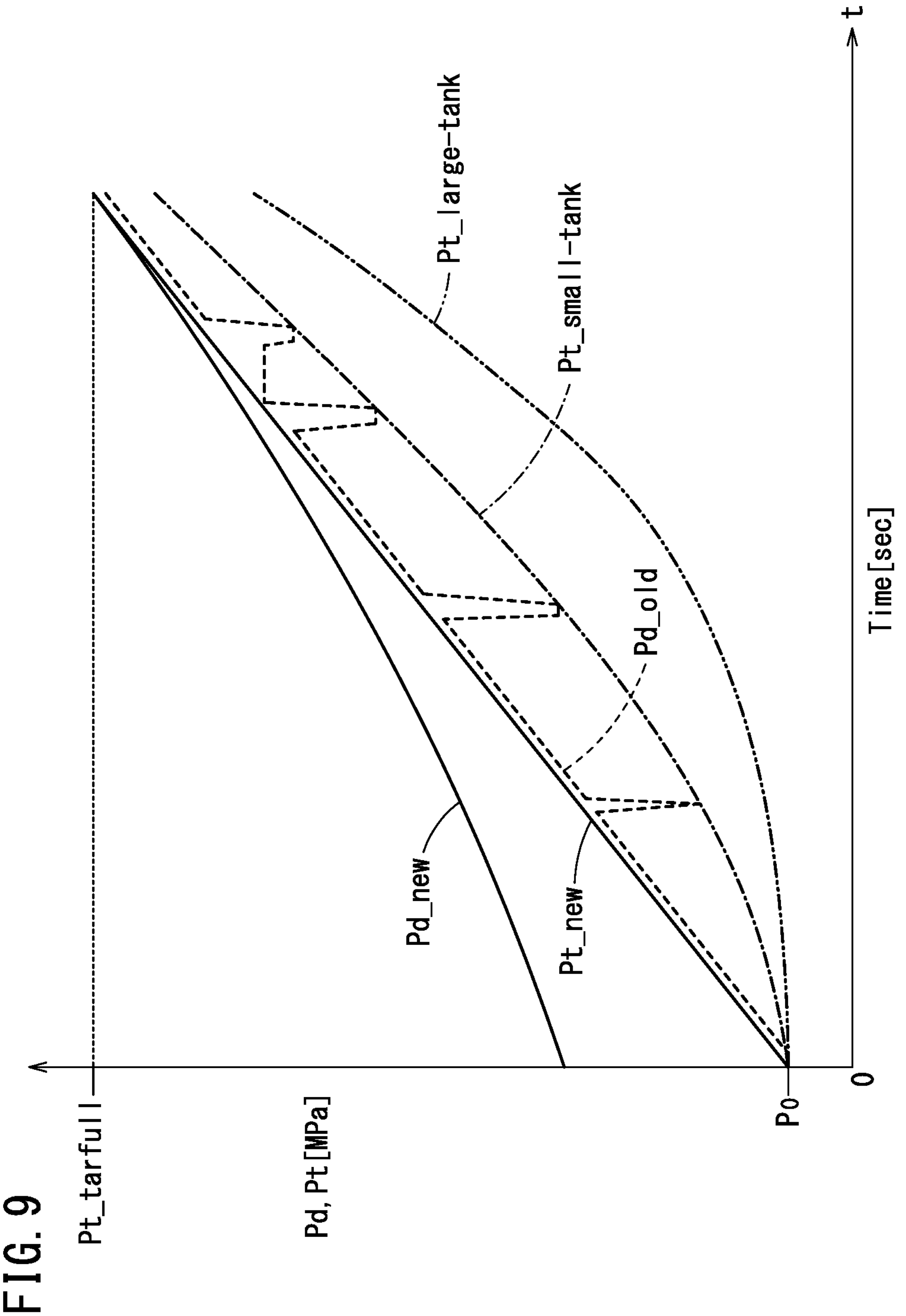
FIG. 9 is a timing chart for comparative explanation of the gas filling method according to the embodiment and the gas filling method according to a comparative example.

With reference to FIG. 9, comparison between a gas filling method according to the embodiment indicated by the solid line and a gas filling method according to a comparative example indicated by the broken line will be described.

In the gas filling method according to the comparative example, as indicated by a dispenser pressure Pd_old, the gas is filled so that the dispenser pressure Pd increases at a constant pressure rise rate.

In the case of a relatively small-capacity tank mounted on a passenger car, for example, the tank pressure Pt increases along the curve of a tank pressure Pt_small-tank that is indicated by the one dot chain line and is concave upward.

In this case, when the tank pressure Pt_small-tank approaches the fully-filled tank pressure, the pressure difference between the dispenser pressure Pd_old and the tank pressure Pt_small-tank decreases, and thus the gas filling flow rate decreases. As a result, the filling time until the fully-filled tank pressure Pt_tarfull is reached is extended.

In the case of a relatively large-capacity tank mounted on a large vehicle such as a bus or truck, for example, as shown by the curve of a tank pressure Pt_large-tank that is indicated by the two dot chain line and is concave upward, the pressure loss is larger than that in the case of a small-capacity tank, and therefore, it takes much more time to reach the fully-filled tank pressure Pt_tarfull.

On the other hand, in the gas filling method according to the embodiment, for example, the tank pressure Pt is increased (linearly increased) along a straight line of a tank pressure Pt_new indicated by the solid line at a constant pressure rise rate. The gas flow rate is varied by adjusting the opening degree of the flow rate adjusting valve 28 so that the tank pressure Pt_new linearly increases to the fully-filled tank pressure Pt_tarfull. In this way, as indicated by the dispenser pressure Pd_new, the dispenser pressure Pd is changed not along a straight line but along a curve that is slightly concave downward.

In the gas filling method according to the embodiment, since the dispenser pressure Pd_new (the pressure in the hydrogen station 14) is considerably higher than the tank pressure Pt_new in the first half of filling, the gas flow rate can be increased. As a result, the filling time required for the tank pressure Pt to reach the target tank pressure (fully-filled tank pressure) Pt_tarfull from the initial tank pressure $P_0$ can be significantly shortened as compared with the comparative example.

In this manner, in the gas filling method according to the embodiment, since the tank pressure Pt can be increased linearly as the tank pressure Pt_new, the variation in the filling time until the fully-filled tank pressure Pt_tarfull is reached is reduced regardless of the tank capacity. That is, the tank 50 can be accurately filled up to the fully-filled tank pressure Pt_tarfull in a short time.

[Invention that can be Grasped from Embodiment]

The invention that can be grasped from the above embodiment will be described below. For convenience of understanding, some of the constituent elements are denoted by the reference numerals used in the above-described embodiment, but the constituent elements are not limited to those denoted by the reference numerals.

(1) The gas filling method according to the present invention is a gas filling method for filling the tank 50 with gas from the accumulator 20 of the gas in the gas filling system 10, the gas filling system including the tank, the accumulator, and the pipe 100 configured to connect the accumulator and the tank, and supply the gas from the accumulator to the tank, the gas filling method including: the target pressure rise rate setting step S1 of setting the target pressure rise rate Rptar which is a temporal change of the target tank pressure Pt_tar, when the tank is filled with the gas; and the flow rate control step S2*d* of adjusting, during filling of the tank with the gas, the flow rate of the gas supplied from the accumulator to the tank in a manner so that the dispenser pressure Pd, which is the gas pressure in the accumulator, becomes a pressure that is higher than the target tank pressure and allows the target pressure rise rate to be maintained.

With this configuration, the flow rate of the gas supplied from the accumulator to the tank through the pipe is adjusted so that the dispenser pressure is becomes a pressure that is higher than the target tank pressure and allows the target pressure rise rate, which is a temporal change of the target tank pressure, to be maintained. As a result, the tank can be accurately filled with the gas from the accumulator through the pipe in a short time up to the fully-filled tank pressure. This in turn contributes to energy efficiency.

(2) Further, in the gas filling method, in the flow rate control step, the dispenser pressure that allows the target pressure rise rate to be maintained may be calculated so as to match the sum of the pressure loss dPloss in the pipe and the tank pressure Pt.

The pressure loss in the pipe can be calculated based on the gas density ρ and the mass flow rate m. Therefore, it is possible to fill the tank with the gas from the accumulator through the pipe while confirming that the tank pressure is rising at the target pressure rise rate.

(3) Further, in the gas filling method, the pressure loss may be calculated as a value obtained by dividing, by the gas density, a value obtained by multiplying the pressure loss coefficient k0 by a square of the mass flow rate m of the gas, and the pressure loss coefficient may be updated based on a detected pressure loss detected when supply of the gas from the accumulator is intentionally stopped during the supply of the gas.

In this way, by calculating the pressure loss in the pipe during the supply of the gas, it is possible to continuously monitor whether or not the temporal change of the tank pressure matches the target pressure rise rate.

(4) Furthermore, in the gas filling method, the target pressure rise rate may be set to a constant pressure rise rate.

As described above, by setting the target pressure rise rate so that the gas pressure linearly increases, the gas filling control is simplified, and even if the gas filling is temporarily stopped in the middle and is restarted, the continuity of the gas filling control can be easily maintained.

The present invention is not limited to the above disclosure, and various modifications are possible without departing from the essence and gist of the present invention.

The invention claimed is:

1. A gas filling method for filling a tank with gas from an accumulator of the gas in a gas filling system, the gas filling system including:

the tank;

the accumulator; and a pipe configured to connect the accumulator and the tank, and supply the gas from the accumulator to the tank, the gas filling method comprising:

setting a target pressure rise rate which is a temporal change of a target tank pressure, when the tank is filled with the gas; and adjusting, during filling of the tank with the gas, a flow rate of the gas supplied from the accumulator to the tank in a manner so that a dispenser pressure, which is a gas pressure in the accumulator, becomes a pressure that is higher than the target tank pressure and allows the target pressure rise rate to be maintained.

2. The gas filling method according to claim 1, wherein in the adjusting of the flow rate, the dispenser pressure that allows the target pressure rise rate to be maintained is calculated so as to match a sum of a pressure loss in the pipe and a tank pressure.

3. The gas filling method according to claim 2, wherein the pressure loss is calculated as a value obtained by dividing, by a gas density, a value obtained by multiplying a pressure loss coefficient by a square of a mass flow rate of the gas, and the pressure loss coefficient is updated based on a detected pressure loss that is detected when supply of the gas from the accumulator is intentionally stopped during the supply of the gas.

4. The gas filling method according to claim 1, wherein the target pressure rise rate is set to a constant pressure rise rate.

* * * * *